UNITED STATES PATENT OFFICE.

WILLIAM N. BLAKEMAN, JR., OF NEW YORK, N. Y.

PAINT COMPOUND AND PROCESS OF MAKING THE SAME.

No. 883,520.　　　Specification of Letters Patent.　　　Patented March 31, 1908.

Application filed February 26, 1906. Serial No. 302,986.

*To all whom it may concern:*

Be it known that I, WILLIAM N. BLAKEMAN, Jr., a citizen of the United States, and resident of the borough of Manhattan, in the city, county, and State of New York, have invented a new and useful Pigment Compound and Process of Making the Same, which invention is fully set forth in the following specification.

The object of this invention is to produce, in paste form, a compound of a pigment which contains no hydroxyl, and a liquid, which compound, or magma, when subsequently attenuated in an oil, will form a paint that will spread in a smooth, uniform, homogeneous and elastic film, and dry rapidly.

Pigments which carry no water in combination and were formerly known as anhydrous, but which may be more accurately described as pigments containing no hydroxyl, do not form satisfactory saponaceous compounds, have very limited spreading power, and are slow in drying when ground in an oil vehicle; and Dutch process white lead, in consequence of its quick formation of a saponaceous compound, due to the hydrated oxid of lead which it carries in combination—has, heretofore, been regarded as the only white pigment suitable for use as a sole basis for paint.

I have discovered that by grinding a pigment which contains no hydroxyl and is deficient in spreading power in a rancidified fatty liquid to the consistency of a paste, a compound or magma will be formed, which, when subsequently extended with commercial oil as a vehicle, will form a paint that will spread in a smooth, uniform and elastic film, and dry rapidly, in all physical respects equal, if not superior to, the combination of Dutch lead in linseed oil.

The rancidified liquid with which I grind the pigment may be formed from an oil or fat, such as linseed, tung, or castor oil; a derivative of an oil or fat, such as oleic acid, olein, stearic acid, stearin; or other equivalent substance. I prefer to employ linseed oil.

Selecting linseed oil to illustrate my invention, it may be rancidified by any suitable method, such as by exposing the oil in broad surfaces to the action of air and light until it has rancidified and responds to the Kreis test for rancidity (*Chemiker Zeitung*, 1899, Vol. 23, p. 802). As, however, this method will be found a slow one and may require several months exposure, depending upon climatic conditions, I prefer to hydrate the oil before exposing it to air and light, as I have found that such hydration will shorten, very greatly, the time necessary for rancidification. The hydration of the oil may be effected by suspending the oil in a suitable vessel over a body of water, with a covering arranged to retain a vaporous atmosphere in contact with the oil; or by placing the oil in a vessel having about one per cent. of distilled water on the bottom, and exposing this vessel to light, with frequent gentle agitation, until the water has been absorbed and combined with the oil; or by placing the oil in a vessel with about one per cent. of water distributed on the bottom, and then subjecting it to a heat of about 140° Fahr., with frequent gentle agitation, until the water has been absorbed and combined with the oil, which will require from eight to ten hours, or longer, the time depending upon keeping the water in minute contact with the oil by agitation. This latter method of hydration is the one I prefer to employ, but, no matter which method is employed, the oil, after hydration, should be exposed in broad surfaces to the action of air and light until rancidification has set in, which will require from six to eight days, the shorter period if exposed to continuous bright sunlight.

When the oil responds to the Kreis test for rancidity, it is in condition for use with those pigments which contain no hydroxyl, and are ordinarily deficient in spreading power when ground in oil, and I take zinc oxid, for example, and grind it in a sufficient quantity of this rancidified oil to form a paste of about the same consistency as "white lead ground in oil" at present on the market. From eight to ten per cent. of the rancidified oil will be about the proper percentage for zinc oxid, but it will be evident to those skilled in the art that a heavier or less bulky pigment will require a smaller percentage of the oil to form a paste of the same consistency, while a still lighter pigment will require a larger percentage.

When desired for use as a paint, the paste, or magma, can be extended with say ninety parts of commercial linseed oil, and when so extended, the paint produced will be found satisfactory in all respects.

The pigments which contain no hydroxyl, rendered available for use by my invention, include zinc oxid, zinc sulfid, lead carbonate, lead sulfate, lead sulfite, barium sulfate, barium carbonate, strontium sulfate, strontium carbonate, calcium carbonate, and the various combinations of zinc and lead resulting from furnace sublimation and known commercially as sublimed lead, zinco-sulfate of lead, oxysulfate of lead, zinc-lead and other trade designations. These pigments may be used either singly or in combination, as my invention imparts spreading power to all of them; but, as some of these pigments (the earthy sulfates and carbonates, for example), are deficient in opacity, it will be found advantageous to combine therewith a proportion of zinc oxid. For colored paints, the addition of the colored pigment or pigments will supply the necessary opacity.

As the pigments named vary in composition, it may be found necessary in practice to vary the rancidity of the fatty liquid in order to obtain the best results with a particular pigment or combination of pigments—a dense or heavy pigment, like the lead salts, requiring less rancidity than a light or bulky pigment like zinc oxid. It is obvious, however, that, in rancidifying the fatty liquid, if the exposure to air and light be prolonged after it first responds to the test for rancidity, the rancidity will be intensified and a more highly rancidified liquid produced and hence by regulating the exposure, any desired degree of rancidity can be obtained. In no event, however, should the exposure be continued until the fatty liquid assumes a solid or semi-solid condition, as it will then no longer be miscible with or soluble in commercial oil, and will be useless for my purpose. My rancidified liquid is miscible in all proportions with linseed and other fatty oils, and hence, by adopting a uniform standard of rancidity for the liquid, such liquid can be attenuated in linseed oil or other fatty oil until the proper condition of rancidity is obtained necessary for the pigment with which it is to be combined, and then the pigment be ground into a paste with such rancidified liquid and the attenuating oil.

In order to ascertain the rancidity necessary for a particular pigment, the film test may be employed. For example: When eight to ten per cent. of linseed oil slightly rancidified as shown by the Kreis test, or, one quarter to one half of one per cent. of linseed oil highly rancified and attenuated in eight or ten per cent. of an attenuating oil, is ground into paste form with 100 per cent. of zinc oxid, and this magma then extended with 90 per cent. of linseed oil to form a paint, and the usual quantity of liquid drier added, if the paint so produced follows the brush in a smooth, homogeneous, and uniform film, does not run, crack, or craze, and dries in from three to five hours, the degree of rancidity in the liquid may be regarded as satisfactory, and the rancidifying process may be arrested.

Any other oil or fat (animal or vegetable) or a fatty derivative of an oil or fat may be used instead of linseed oil to form the rancidified liquid, and be rancidified, or hydrated and rancidified, by any of the methods above described. Should any of the substances named be found to be too viscous to be easily rancidified, they may be first brought to the proper state of fluidity by the use of any attenuant with which they are miscible or soluble, and then be rancidified, or hydrated and rancidified. In hydrating a viscous liquid such as castor oil or tung oil, it will be found necessary to give a longer exposure to heat than for a less viscous liquid.

The oil, before being rancidified, and either before or after hydration, may be oxidized by any suitable method of oxidation, such as by heating it on oxidizers; or by submitting it with heat, to the action of pure oxygen under pressure; or by passing through it, with heat, thoroughly dried air; or by incorporating with it any highly oxidized body with which it is miscible, such as boiled linseed oil, manganese resinate, elaidinized oil and the like.

A more energetic action will be produced in the magma, if the pigment be treated by combining therewith a hydrated metallic or earthy oxid, such as hydroxid of zinc, or other hydroxid. From one to five per cent. of hydroxid may be used, depending upon the pigment treated, a light or bulky pigment requiring a larger percentage than a dense or heavy one. The hydroxid may be attenuated in water, then incorporated with the pigment, and the water afterwards evaporated; or it may be precipitated upon the pigment at its first formation.

Two or more substances of the character described may be rancidified, or hydrated and rancidified, and combined in the paste compound; and two or more oils, drying, or non-drying, may be combined to form the paint-vehicle. Any suitable drier, such as linseed, tung or other drying oil, or a commercial liquid drier, may be used in the paint. Heat, pressure and agitation may be employed whenever deemed advisable.

From the above description, it will be seen that, as a result of my invention, all those pigments which contain no hydroxyl, and which have heretofore been regarded as unavailable for use except in conjunction with white lead, can be placed upon the market in paste form ready to be extended or attenuated with linseed oil by the painter, exactly as white lead is sold and manipulated at the present day; and as I believe myself to be the first person to accomplish this result, I wish it to be understood that the rancidification of the liquid, the proportion of substances, the number and character of ingredients, and the steps of the process, may be varied as practice shall dictate without departing from the essence of my invention.

Having thus fully described my invention, I claim:—

1. A compound or mixture, in paste form, of a pigment which contains no hydroxyl; and is deficient in spreading power and a rancidified fatty substance.

2. A compound or mixture, in paste form, of a pigment which contains no hydroxyl; and is deficient in spreading power and a rancidified oil.

3. A compound or mixture, in paste form, of a pigment which contains no hydroxyl; and is deficient in spreading power, a rancidified fatty substance; and an attenuating oil.

4. A compound or mixture, in paste form, of a pigment which contains no hydroxyl and is deficient in spreading power, a rancidified fatty liquid; and an attenuating oil.

5. The process herein described, which consists in first rancidifying a liquid and then grinding therein, to form a paste, a pigment which contains no hydroxyl, and is deficient in spreading power.

6. The process herein described, which consists in first rancidifying a liquid, then attenuating it in an oil, and then grinding therein, to form a paste, a pigment which contains no hydroxyl, and is deficient in spreading power.

WM. N. BLAKEMAN, Jr.

Witnesses:
FRANCIS P. REILLY,
MABEL O. FAHNESTOCK.